United States Patent
Yaeger et al.

(10) Patent No.: US 7,564,995 B1
(45) Date of Patent: Jul. 21, 2009

(54) METHOD AND APPARATUS FOR ACQUIRING AND ORGANIZING INK INFORMATION IN PEN-AWARE COMPUTER SYSTEMS

(75) Inventors: Larry S. Yaeger, Morgantown, IN (US); Richard W. Fabrick, II, Campbell, CA (US); Giulia M. Pagallo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1009 days.

(21) Appl. No.: 09/520,206

(22) Filed: Mar. 7, 2000

(51) Int. Cl.
*G06K 9/00* (2006.01)

(52) U.S. Cl. .................... 382/119; 382/187; 382/188; 382/189

(58) Field of Classification Search ......... 382/187–189, 382/119, 315; 345/173, 179; 178/18.03
See application file for complete search history.

(56) References Cited

U.S. PATENT DOCUMENTS

| | | | |
|---|---|---|---|
| 4,656,317 A | | 4/1987 | Tsugei et al. |
| 4,718,102 A | * | 1/1988 | Crane et al. .................. 382/185 |
| 5,454,046 A | * | 9/1995 | Carman, II .................. 382/186 |
| 5,455,901 A | | 10/1995 | Friend et al. |
| 5,463,696 A | | 10/1995 | Beernink et al. |
| 5,517,578 A | | 5/1996 | Altman et al. |
| 5,613,019 A | | 3/1997 | Altman et al. |
| 5,615,285 A | | 3/1997 | Beernink |
| 5,682,439 A | * | 10/1997 | Beernink et al. ............. 382/187 |
| 5,710,831 A | | 1/1998 | Beernink et al. |
| 5,778,404 A | * | 7/1998 | Capps et al. ................. 715/531 |
| 5,784,504 A | * | 7/1998 | Anderson et al. ........... 382/309 |
| 5,832,428 A | | 11/1998 | Chow et al. |
| 5,917,941 A | | 6/1999 | Webb et al. |
| 6,144,764 A | * | 11/2000 | Yamakawa et al. .......... 382/187 |
| 6,493,464 B1 | * | 12/2002 | Hawkins et al. ............. 382/189 |

OTHER PUBLICATIONS

Birse, Cameron, and Kubota, Rich, ADB-The Untold Story: Space Aliens Ate My House, Http://developer.apple.com/technotes, Apple Computer, Incorporated (c) 1999, pp. 1-21.

(Continued)

*Primary Examiner*—Brian Q Le
(74) *Attorney, Agent, or Firm*—Fish & Richardson P.C.

(57) ABSTRACT

An ink manager running at a computer system receives ink information entered at a pen-based input/display device and accumulates the ink information into ink strokes. The ink manager communicates with a handwriting recognition engine and includes an ink phrase termination engine that is configured to detect the occurrence of one or more ink phrase termination events by examining the ink information. Upon the occurrence of an ink phrase termination event, the ink manager notifies the handwriting recognition engine and organizes the preceding ink strokes into an ink phrase data structure. The ink manager may also pass the ink phrase to an application executing on the computer system that is associated with the ink information, and it, in response, may return a reference pointer and a recognition context to the ink manager. The reference pointer and recognition context are then appended to the ink phrase data structure. Utilizing the recognition context identified by the application, the handwriting recognition engine generates one or more hypotheses for the ink phrase, and provides them to the ink manager. The ink manager forwards the hypotheses together with the reference pointer to the application and may also append them to the ink phrase data structure.

3 Claims, 6 Drawing Sheets

OTHER PUBLICATIONS

Processing Events, Http://developer.apple.com/techpubs, Apple Computer, Incorporated, (c) 1999, pp. 1-9.

Introduction to Events, Http://developer.apple.com/techpubs, Apple Computer, Incorporated, (c) 1999, pp. 1-5.

Stevenson, David, Absolute Pointing Device Memory Structure, Http://developer.apple.com/technotes,Apple Computer, Incorporated, (c) 1999 pp. 1-6.

About the ADB Manager, Http://developer.apple.com/techpubs, Apple Computer, Incorporated, (c) 1999, pp. 1-16.

Yaeger, Larry S., Webb, Brandyn J. and Lyon, Richard F., Combining Neutral Networks and Context-Drive Search for On-Line, Printed Handwriting Recognition in the Newton, pp. 1-15.

Programmer's Guide to Pen Services (for Microsoft Windows 95), Microsoft Press, (c) 1995, Table of Contents, pp. 1-47, 58-71.

* cited by examiner

METHOD AND APPARATUS FOR ACQUIRING AND ORGANIZING INK INFORMATION IN PEN-AWARE COMPUTER SYSTEMS

FIELD OF THE INVENTION

The present invention relates generally to the field of computers, and more specifically, to an ink manager for acquiring and organizing pen-based ink information for use by pen-aware and other applications.

BACKGROUND OF THE INVENTION

Computers, such as personal computers, often include one or more input devices, such as a keyboard and a mouse, that allow a user to control the computer. More sophisticated input devices include voice-recognition input systems and "pen" or stylus based input systems. With pen-based input systems, the user relies on his or her own handwriting or drawing to control or operate the computer. These input systems typically include a hardware device called a "tablet" that is connected to the serial port of the computer. The tablet may include an integrated display screen so that the tablet can serve as both an input and an output device. When operating as an input device, the tablet senses the position of the tip of the pen as it moves across the tablet surface and provides this information to the computer's central processing unit. To provide the user with visual feedback as the pen moves, the computer typically displays "ink" (i.e., a path of pixels tracing the pen's movement) simulating the ink dropped by a real pen. If the tablet has an integrated display screen, this electronic ink is typically drawn directly beneath the tip of the moving pen. For an opaque, input-only tablet, the ink is typically drawn on a normal computer screen to which the tablet has been "mapped". Whether integrated with the tablet or not, the screen typically displays standard computer-generated information, such as text, images, icons and so forth.

In addition to the tablet, pen-based computers also have a software pen driver that interfaces with the tablet and periodically samples the position of the pen, e.g., 100 times a second. The pen driver passes this ink data to an ink manager that organizes it and coordinates the recognition process. Specifically, the ink manager organizes the ink data into ink strokes, which are defined as the ink data collected until the pen is lifted from the tablet. The ink manager passes the ink strokes to a recognizer that employs various tools, such as neural networks, vocabularies, grammars, etc., to translate the ink strokes into alpha-numeric characters, symbols or shapes. The recognizer may generate several hypotheses of what the ink strokes might be, and each hypothesis may have a corresponding probability. The hypotheses are then provided to an application program which may treat the recognized ink data as an input event.

With Pen Services for Windows 95® from Microsoft Corporation, ink strokes are organized into pen input sessions. See Programmer's Guide to Pen Services for Microsoft Windows 95 (1995 Microsoft Press). A pen input session begins as soon as the user touches the pen to the tablet and ends when the user taps the pen outside of the writing area (e.g., tapping an OK button) or a brief period of inactivity elapses. A new session begins when the user resumes writing. All of the ink strokes corresponding to a given pen input session are accumulated into a single pen data object. An application program associated with the pen input session can basically choose one of two modes of operation. First, the application can choose only to receive the recognition results, thereby allowing the system to process and organize the ink data based on its default settings and to interface with a default recognizer. Alternatively, the application program can request the "raw" ink data and process it in any number of ways. For example, it can buffer the data to delay recognition or it can throw the data away. This ink data is provided to the application on a stroke-by-stroke basis. If the application wishes to have the data recognized, it passes the raw ink data to the recognizer itself. Any special recognition requirements, such as field-specific recognition contexts (e.g., name, address, social security, or other types of input fields), and any unique affiliations between ink input sessions and specific input fields must also be determined on a stroke-by-stroke basis, typically based upon the first stroke that is received.

This collection and organization of ink data into pen input sessions on such a stroke-by-stroke basis has several disadvantages. As noted, to associate ink data with a particular data entry field, the system generally relies solely upon the location of the first ink stroke entered by the user. If a pen input area is declared and subsequent strokes extend outside of that area, the system will not associate those strokes with the data entry field, even though the user may have intended these subsequent ink strokes to be a part of that data entry field. Further, if that first stroke is only slightly misplaced (e.g., if the cross-bar of a capital "T" is drawn first and written too high), the entire subsequent session may be affiliated with the wrong input field. Associating ink with the wrong input field may result in the recognition results flowing to the wrong place, and, if a special recognition context is used for each input field (e.g., name vs. address vs. social security fields, etc.), the wrong context may be applied during recognition.

Even systems that attempt to improve this situation by using each stroke to determine the input field anew, such as the Apple Newton from Apple Computer Inc. of at; Cupertino, Calif., can suffer from failure modes that make the situation difficult both for end users and for application developers. For example, a word that accidentally spans two input fields even a tiny amount (due, for instance, to a stray ascender, descender, crossbar, or dot) may be broken up into multiple sessions, causing misrecognition and invalid data entries that must be manually corrected.

Accordingly, a need exists for improving the way in which ink data is organized so as to facilitate the recognition process and also to improve the association of ink data to particular data entry fields.

SUMMARY OF THE INVENTION

The present invention, in large part, relates to the observation that client applications and handwriting recognition software in pen-based computer systems can make far more accurate ink-related decisions based on entire ink phrases, rather than individual ink strokes. Accordingly, the invention is directed to an ink manager that is designed to organize ink strokes into ink phrases and to provide these ink phrases to client applications. In the illustrative embodiment, the ink manager interfaces between a pen-based input device, one or more applications (pen-aware or not) and one or more handwriting recognition engines executing on the computer system. The ink manager acquires ink information, such as ink strokes, entered at the pen-based input device, and organizes that information into ink phrases. The ink manager includes an ink phrase termination engine (which may be partially executed in a pen driver component) that is configured to apply one or more ink phrase termination tests to the ink information. If the termination engine detects the occurrence of an ink phrase termination event, the ink manager performs the following steps in order: 1) finishes organizing the strokes into an ink phrase data structure, 2) optionally notifies the current client application program of the termination event by providing it with the ink phrase, thereby allowing the application to determine a suitable affiliation between the ink phrase and a specific input field, specify a reference context (e.g., a pointer) and request a particular recognition context, if desired, 3) notifies the appropriate handwriting recognition engine, so as to allow it to complete its work and provide the recognition results corresponding to the current ink phrase, and 4) sends the now labeled (i.e., recognized) ink phrase to the application, together with any reference context previously identified by the application (in step 2). To the extent the application returns a reference context and/or a recognition context, they may be appended to the ink phrase data structure.

Significantly, by passing the as yet un-recognized ink phrase to the application immediately upon phrase termination (step 2 above), the ink manager allows the application to make specific input field and context determinations on a more suitable unit of data than previous systems—a phrase, rather than a stroke. Consequently, the system can associate the user's ink data with the input fields intended by the user more consistently, even if one or more ink strokes (including the first ink stroke) is wholly or partially outside of the input field. The system can also recognize the ink data more accurately due to the use of the most appropriate recognition context, again as determined by the application based on the ink phrase.

In the preferred embodiment, the ink phrase termination engine applies three ink phrase termination tests to the ink information generated at the pen-based device, and also allows the recognition engine to impose its own phrase termination test. First, the ink phrase termination engine initiates a time-out mechanism upon receiving each ink sample. If the time-out expires before the next ink sample is received, an ink phrase termination event occurs. The value of this time-out is preferably adjustable by the end user. Second, the ink phrase termination engine monitors proximity information acquired by the pen-based input device, and issues an ink phrase termination event when the pen is lifted out-of-proximity from the surface of the input device. That is, the input device includes sensors that detect whether the pen, even though not yet in contact with the surface of the device, is nonetheless near the surface or not (i.e., in or out-of-proximity). Optionally, the application associated with the current pen session may supply the coordinates of a pen input area to the ink manager and request the ink phrase termination engine to issue an ink phrase termination event whenever the ink samples move outside of this area. Finally, ink phrase termination events can be triggered by the handwriting recognition engine. In particular, the recognition engine preferably applies a word segmentation model to the ink information it is receiving on-the-fly. If the engine determines that a new ink sample represents the start of a new word (e.g., the new ink sample is on a new line or is spaced a significant distance horizontally from the prior ink sample), then the recognition engine may issue an ink phrase termination event.

While the ink manager may allow alternative methods of data handling, including stroke-based and even point-based ink accumulation by the client application as well as input-area-based phrase termination, the organization of ink information into ink phrases frees pen-aware applications from the low-level ink collection and handling process, improves the correlation of ink information to specific areas on the pen-based input device, and improves the recognition process.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
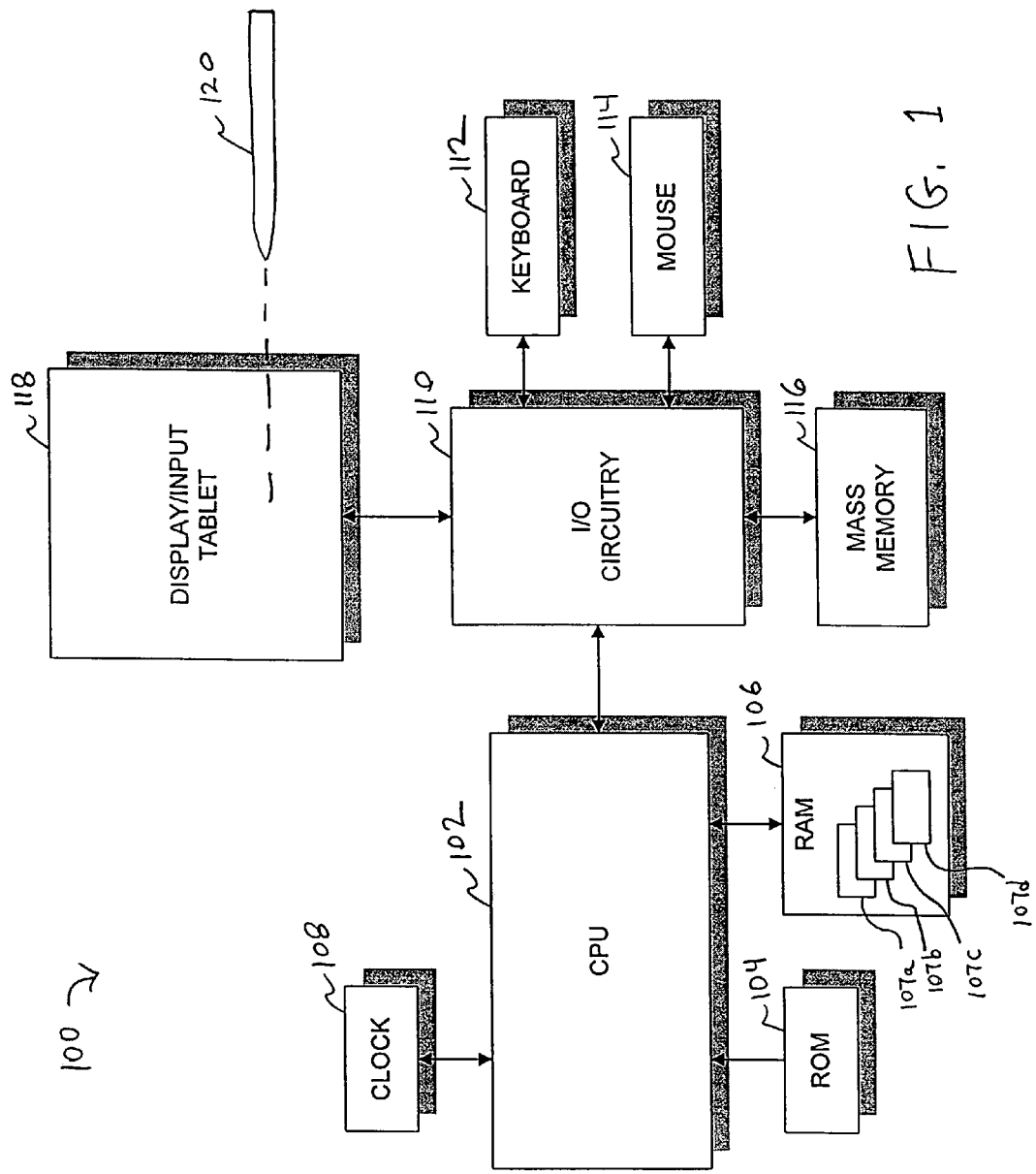
FIG. 1 is a highly schematic block diagram of a computer system in accordance with the present invention.

FIG. 1 shows a computer system 100 having a central processing unit (CPU) 102 that is coupled to a read only memory (ROM) 104 for receiving one or more instruction sets and to a random access memory (RAM) 106 having a plurality of buffers 107a-d for temporarily storing and retrieving information. A clock 108 is also coupled to the CPU 102 for providing clock or timing signals or pulses thereto. The computer system 100 further includes input/output (I/O) circuitry 110 that interfaces between the CPU 102 and one or more peripheral devices, such as a keyboard 112, a mouse 114 and a mass memory device 116 (e.g., a hard drive). The computer system 100 further includes a pen-based input tablet 118 (which may or may not include an integrated display screen as illustrated here) that is similarly coupled via I/O circuitry 110 to the CPU 102. A user may control or interact with the computer system 100 by writing or drawing on the tablet 118 with a pen or stylus 120. Those skilled in the art will understand that the computer system 100 includes one or more bus structures for interconnecting its various components.

A suitable computer system 100 for use with the present invention includes the line of personal computers sold by Apple Computer, Inc. of Cupertino, Calif. Nonetheless, the present invention may also be practiced in the context of other types of computers, including the personal computers sold by International Business Machines Corp. of Armonk, N.Y. and Compaq Computer Corp. of Houston, Tex. All of these computers have resident thereon, and are controlled and coordinated by, operating system software, such as the Apple Mac OS operating system and the Microsoft Windows 95 or 98 operating systems. Other suitable computer systems 100 for use with this invention include hand-held Personal Digital Assistants (PDAs), such as the PalmPilot from 3Com Corporation of Santa Clara, Calif. and WinCE compatible devices.

Figure 2:
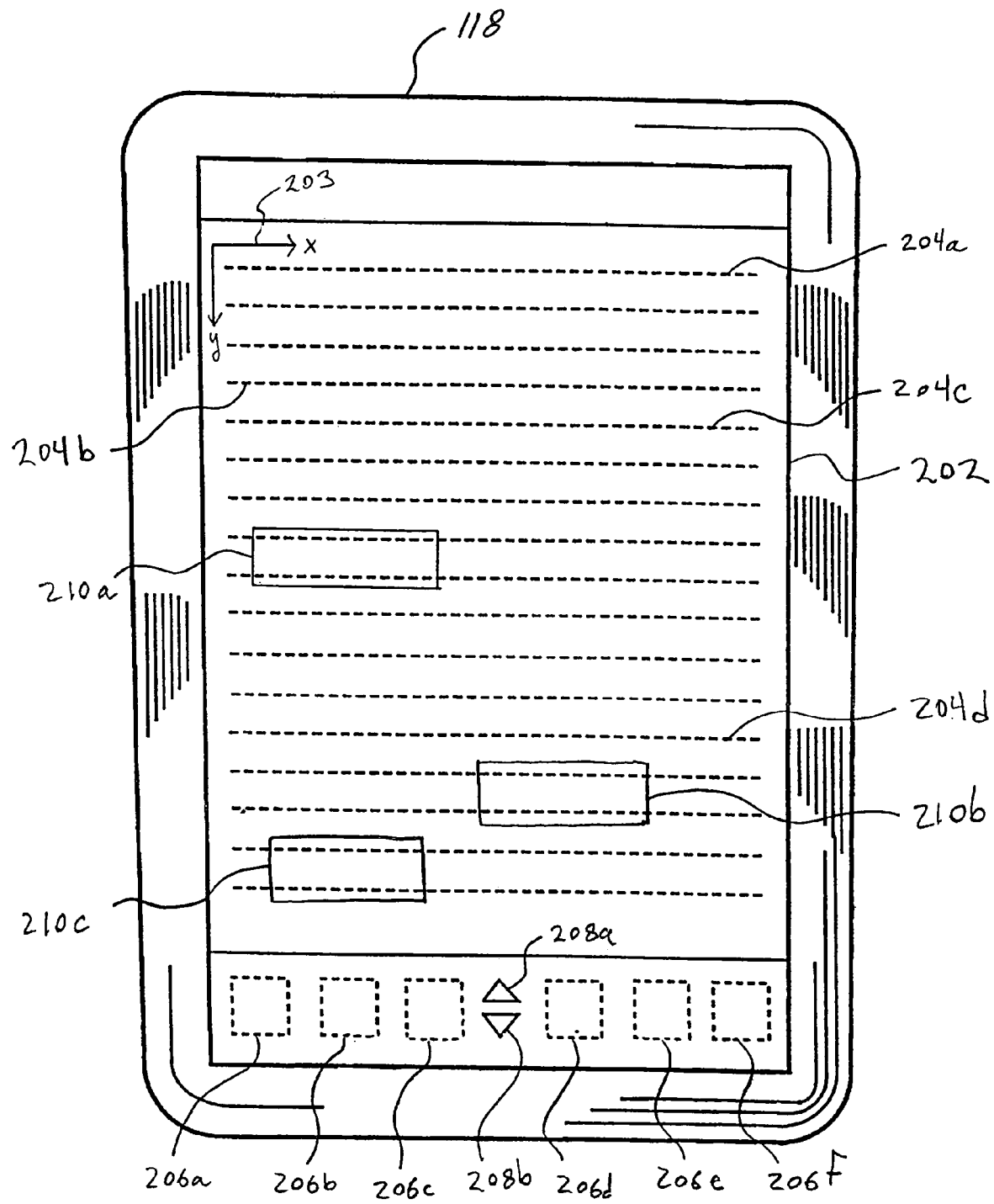
FIG. 2 is a top plan view of the tablet of FIG. 1.

FIG. 2 is a top plan view of the tablet 118. In the illustrative embodiment, tablet 118 is configured to operate as both an input device and an output device. When operating as an output device, tablet 118 receives data from the CPU 102 (FIG. 1) via I/O circuitry 110 and displays that data on a screen 202, such as a liquid crystal display (LCD) screen. The input device of tablet 118 may be a thin layer of sensing circuitry present either beneath the visible screen/tablet surface 202 or as part of a thin, clear membrane (not shown) overlying the screen 202 that is sensitive to the position of the pen 120 on its surface. In operation, a user can provide inputs to the computer system 100 by "writing" on the screen 202 of the tablet 118 with the pen 120. Information concerning the location of the pen 120 on the screen 202 relative to an x-y coordinate system 203 is preferably sampled around 100 times a second and provided to the CPU 102 via I/O circuitry 110. Additional information, such as the orientation of the pen and the pressure of the pen on the screen 202, may also be provided to the CPU 102.

To facilitate the user's interaction with the tablet 118, computer system 100 (FIG. 1) may be arranged or otherwise configured to produce certain images on the screen 202. For example, a series of horizontal lines 204a-d etc. may be displayed on screen 202 to help the user align handwritten text. An array of input buttons 206a-f may also be displayed. By tapping the buttons 206a-f with the pen 120, the user may cause various commands to be carried out by the computer system 100. Up and down scroll buttons 208a and 208b, which can be similarly activated by the pen 120, may also be provided. As described in more detail below, an application program running on the computer system 100 may generate one or more data entry fields or boxes, such as fields 210a-c, on screen 202. These fields or boxes 210a-c may be labeled by the output or display component 202, whether integrated with tablet 118 or as a separate screen, in order to request particular handwritten information from the user, such as city, state, telephone number, etc.

A suitable tablet 118 for use with the present invention includes the Wacom graphics tablets from Wacom Technology Company of Vancouver, Wash.

Figure 3:
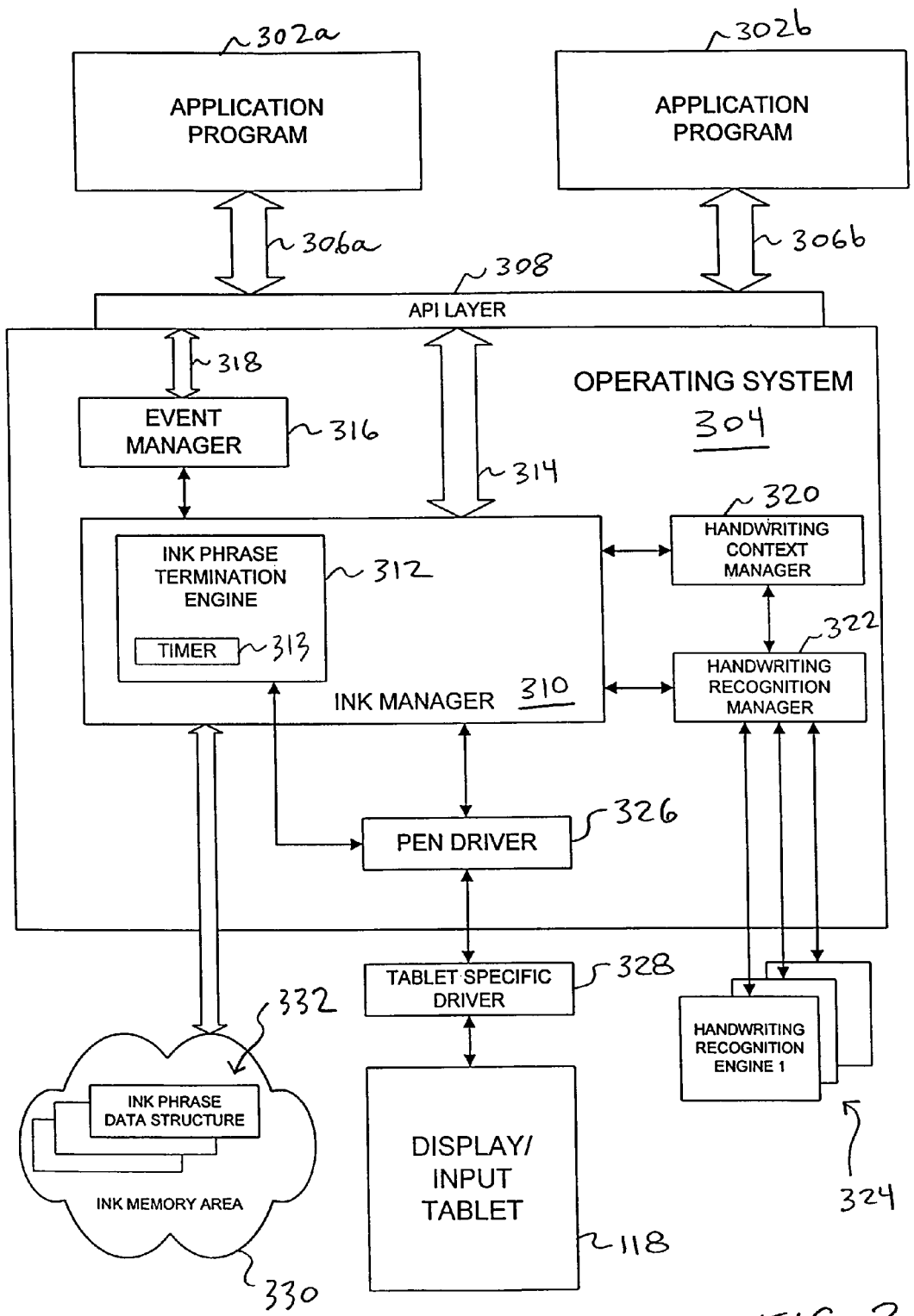
FIG. 3 is a highly schematic, functional block diagram of the software components of the computer system of FIG. 1.

FIG. 3 is a highly schematized, functional block diagram of the software components running on computer system 100 (FIG. 1). These software components generally include one or more application programs or processes, such as application programs 302a and 302b, and an operating system 304. The application programs 302a and 302b execute on the computer system 100 and interact with the operating system 304 as shown by arrows 306a and 306b, through system calls or task commands of an application programming interface (API) layer 308, to control the operations of the computer system 100. In accordance with the invention, the operating system 304 includes a novel ink manager 310 having an ink phrase termination engine 312. The ink manager 310 is coupled to and provides part of the API layer 308 via arrow 314. It is also coupled to an event manager 316, which is itself coupled to the API layer 308 via arrow 318. The ink manager 310 may also be in communicating relationship with a handwriting context manager 320 and a handwriting recognition manager 322.

Installed onto the computer system 100 may be one or more handwriting recognition engines, such as engine 1, engine 2, etc., and designated generally as 324, which may be operably selected by the handwriting recognition manager 322. The input tablet 118 is typically coupled to the ink manager 310 by one or more drivers. Specifically, the ink manager 310 may receive ink information from a pen driver 326 to which it is coupled, and the pen driver 326, in turn, may be coupled to a tablet-specific driver 328. Either the pen driver 326 or the tablet-specific driver 328 interfaces directly with the tablet 118. In the preferred embodiment, the ink phrase termination engine 312 includes a timer 313 and is additionally coupled to the pen driver 326 for evaluating ink information received thereby as described below.

In addition, the ink manager 310 is in communicating relationship directly or indirectly with an ink memory area 330 which may represent a portion of RAM 106 (FIG. 1) allocated to the ink manager 310. Within the ink memory area 330, the ink manager 310 may establish and manipulate one or more ink phrase data structures 332. It should be understood that the ink phrase termination engine 312 may be distributed between the ink manager 310 and the pen driver 326. It should also be understood that the pen driver 326 may even be considered a part of the ink manager 310.

The ink manager 310, termination engine 312 and pen driver 326 may comprise one or more software programs, such as software modules or libraries, pertaining to the methods described herein, that are resident on a computer readable media, such as mass memory 116 (FIG. 1) or RAM 106, and executable by one or more processing elements, such as CPU 102. Other computer readable media, such as floppy disks and CD-ROMs, may also be used to store the program instructions for execution. The ink manager 310, termination engine 312 and pen driver 326 may also be implemented in hardware through a plurality of registers and combinational logic configured to produce sequential logic circuits and cooperating state machines. Those skilled in the art will recognize that various combinations of hardware and software components may also be employed.

The event manager 316, which may also constitute a set of software modules or libraries within the operating system 304, informs application programs 302a, 302b of hardware and software events by sending or returning event messages or records via API layer 308. For example, applications 302a, 302b may periodically issue a WaitNextEvent( ) function or system call to the event manager 316 to check to see if an event has occurred. In response, the event manager 316 returns the events, if any, that are pending for the requesting application. Each application program 302a and 302b preferably includes an event handler for coordinating the request and receipt of events from the event manager 316. The ink manager 310 is preferably in communicating relationship with the event manager 316 so that hardware and software occurrences for which the ink manager 310 is responsible (e.g., ink events) may be passed to the event manager 316 forwarding to the appropriate application or process.

The handwriting recognition manager 322 provides an interface or layer between the one or more handwriting recognition engines 324 and their clients (e.g., the ink manager 310 or the application programs 302a, 302b themselves). In particular, the handwriting recognition manager 322 makes the existence of the various handwriting recognition engines 324 known to the system 100 and establishes a unique identifier for both the recognizers 324 and their clients so as to associate ink information and the corresponding results with the appropriate recognizers and clients. Each recognition engine 324, moreover, in addition to implementing its own recognition process, may utilize its own particular internal ink stroke data structures, its own methods for accumulating ink strokes and its own recognition results data structures.

Figure 4A:
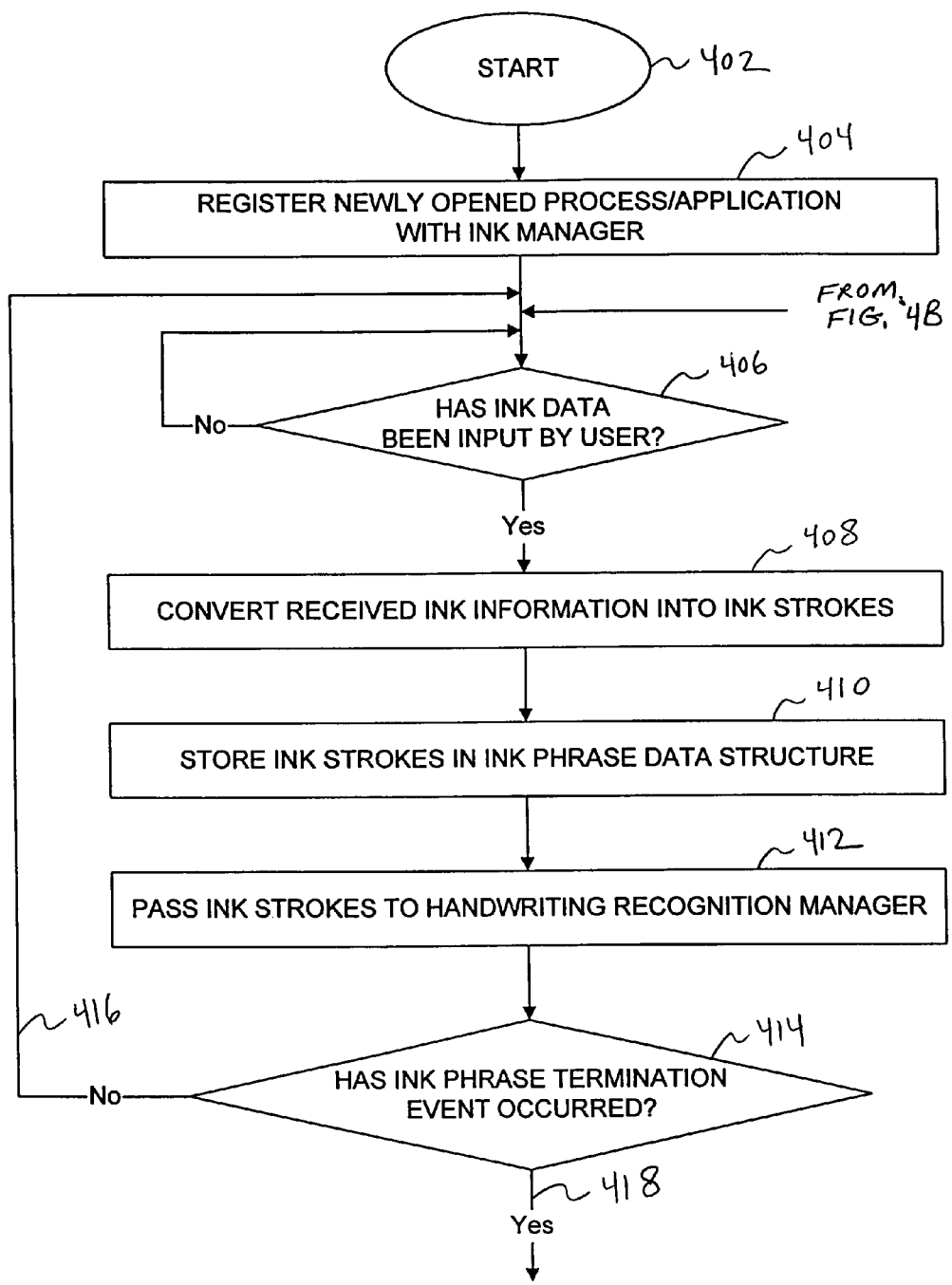
FIGS. 4A-B are flow diagrams of the methods of the present invention.
Figure 4B:
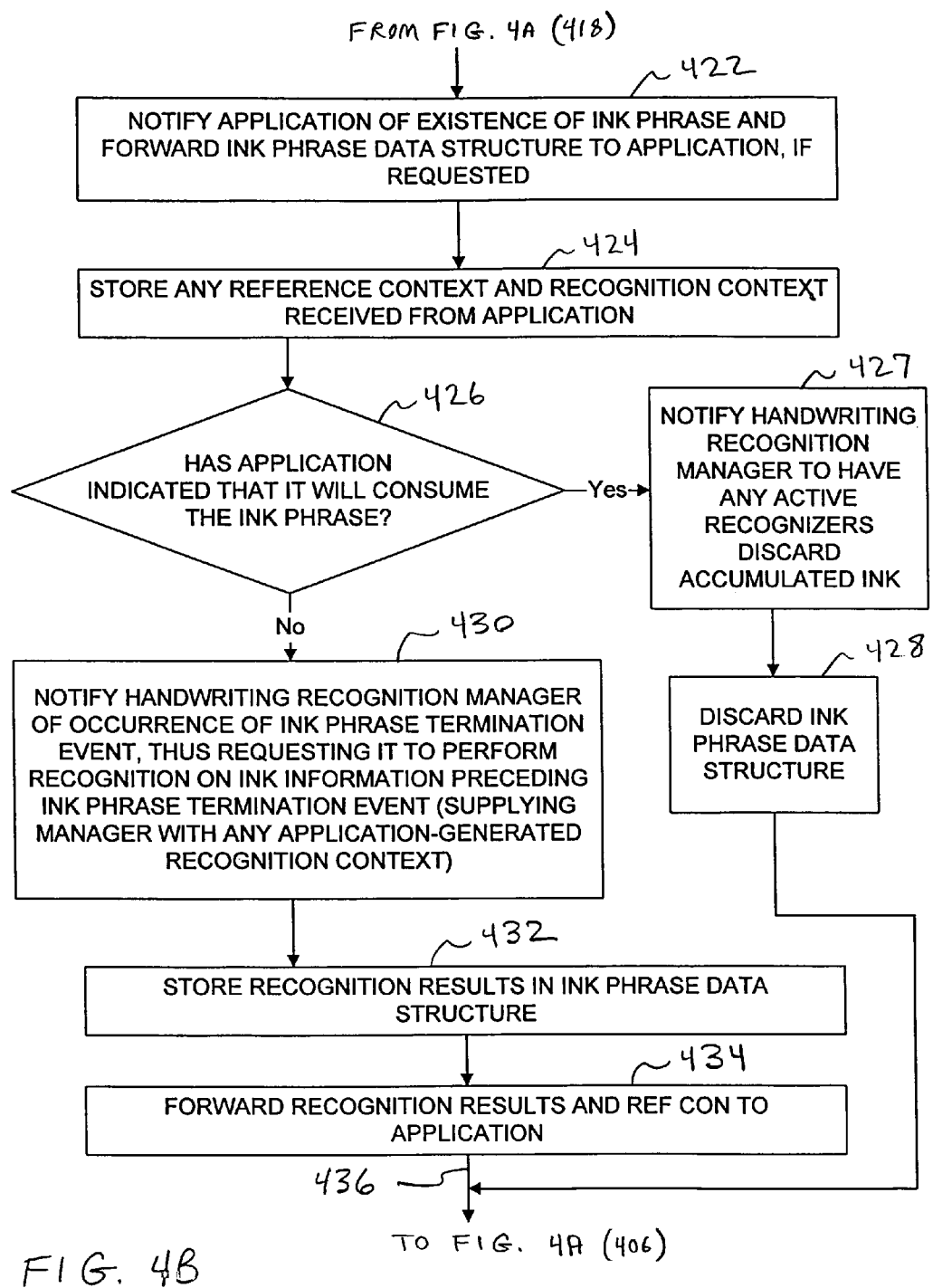

FIGS. 4A-B are flow diagrams of the preferred methods of the present invention. The process of managing ink information begins at start block 402. As applications and processes are opened on the computer system 100 (FIG. 1) by the user, they are placed in a conventional z-ordering scheme by a window manager (not shown) of the operating system 304 (FIG. 3). When an application, such as application 302a, is initially opened, it may register with the ink manager 310, as shown at block 404, by issuing an InkInit( ) system call to the ink manager 310 via the API layer 308, with a unique identifier as an argument that declares the type of data the application 302a wishes to receive from the ink manager 310. The application 302a may also express a request for special end-of-phrase processing and callback by the ink manager 310, by issuing an InkSetEndOfPhraseCallback( ) system call via the API layer 308 having a conventional universal procedure pointer as an argument. The ink manager 310 uses this pointer to uniquely identify and communicate with (e.g., callback)

application 302a when phrase termination events occur, as discussed below. Application 302a may additionally invoke a specific handwriting recognition engine 324 (e.g., engine 1) for use in processing ink information generated at tablet 118.

The ink manager 310 and/or pen driver 326 look for ink data as entered by the user as indicated by decision block 406. Until such ink data is detected, decision block 406 loops back on itself as shown by No arrow 407. When the user inks, i.e., when the user places the pen 120 in contact with the tablet 118 and moves the pen 120 across its surface, ink information, such as ink data points, are generated by the tablet 118 and received and processed by the tablet-specific driver 328 and the pen driver 326. This ink information is assumed to be targeted at the foreground application process. The top most open application or process, which is typically the application that is currently being operated by the user, is called the foreground process, while the other open applications and processes are referred to as background processes. To retrieve this ink information, the pen driver 326 may periodically poll the tablet-specific driver 328 or the tablet 118 (typically via a device manager system service). Alternatively, the pen driver 326 may be called by the tablet-specific driver 328 (or a system device manager) whenever new ink information is available. For example, the tablet-specific driver 328 may communicate with the tablet via the Apple Desktop Bus (ADB) and then may store ink information in a DV01 data structure and communicate with the pen driver 326 via that data structure. Both the DV01 data structure and the ADB are defined and implemented by Apple Computer Inc. and are well-known to those skilled in the art to which the present invention pertains.

The pen driver 326 preferably collects and organizes this ink information (e.g., individual ink data points or pen locations) into corresponding ink strokes as indicated at block 408. More specifically, the pen driver 326 begins storing the ink data points in a first buffer 107a. When the ink information from the tablet-specific driver 328 indicates that the pen 120 (FIG. 1) has been lifted from the screen 202, the pen driver 326 stops storing the ink data points in the first buffer 107a and initiates a second buffer 107b for subsequent ink data points (i.e., when the pen 120 is again placed in contact with and moved across the screen 202) and so on. Accordingly, each buffer 107 initialized by the pen driver 326 contains those ink data points corresponding to one ink stroke. To avoid generating new ink strokes when the pen 120 "skips" across the screen 202, as opposed to being lifted in order to begin a new stroke, the pen driver 326 may impose a short time out-of-contact with screen 202 requirement before concluding that the subsequent ink data points represent a new stroke.

The ink manager 310 may periodically poll the pen driver 326 to retrieve the ink strokes that have been gathered. Or, preferably, the pen driver 326 will notify the ink manager 310, as part of an event-driven model, when it has a new ink stroke. The ink manager 310 stores the retrieved ink strokes within an ink phrase data structure 332 as indicated at block 410.

Figure 5:
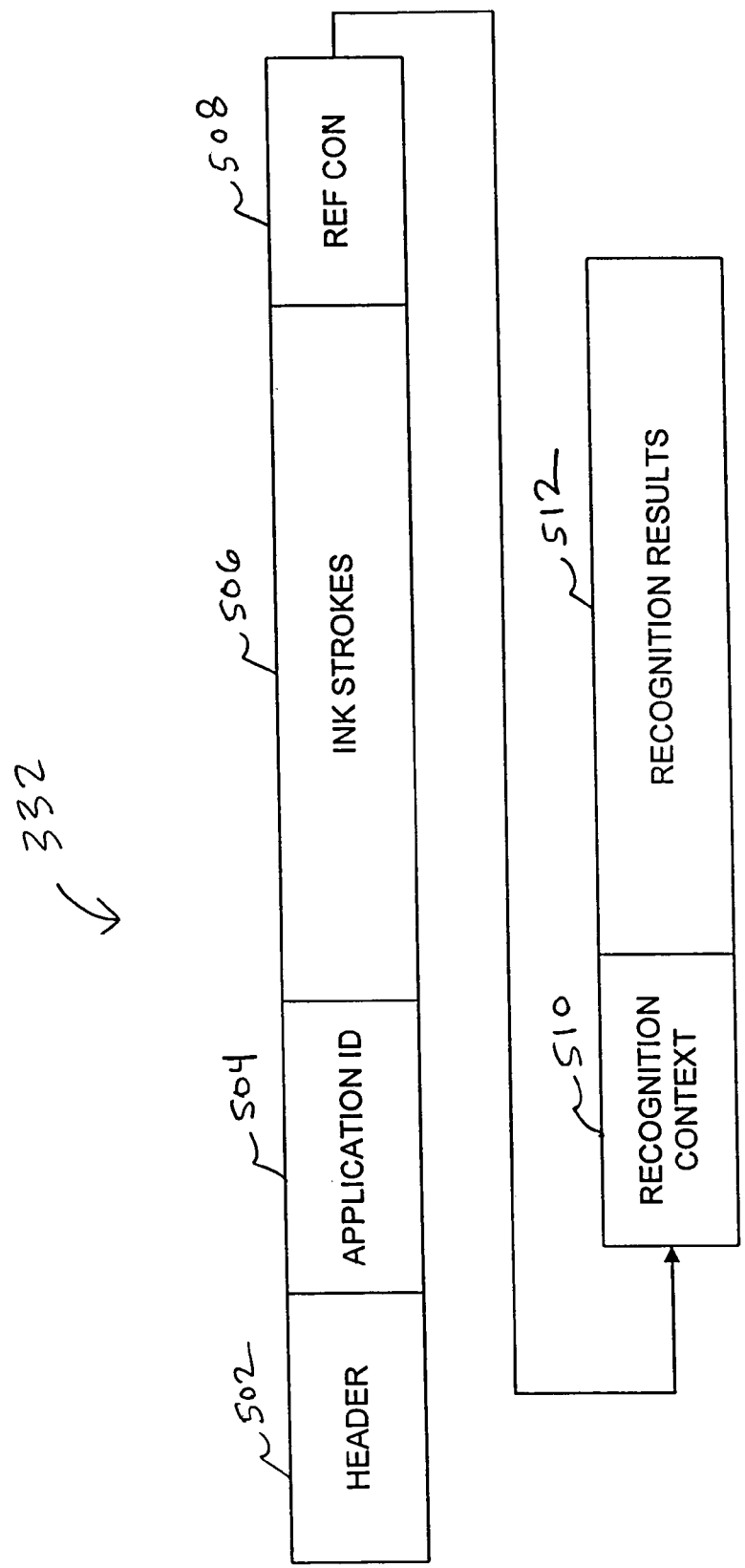
FIG. 5 is a highly schematic block diagram of an ink phrase data structure.

FIG. 5 is a highly schematic block diagram of a preferred ink phrase data structure 332. The ink phrase data structure 332 includes a plurality of fields including a header field 502, containing information such as phrase termination type, possible modifier keys, number of strokes, and bounding box, and an application identifier (ID) field 504. The application ID field 504 preferably contains a unique process identifier for the process that was in the foreground when the user entered the corresponding ink. The data structure 332 further includes an ink strokes field 506 in which the ink manager 310 preferably stores the ink stroke information retrieved from the pen driver 326. As described below, the data structure 332 further includes a reference context (REF CON) field 508, a recognition context field 510 and a recognition results field 512.

In addition to storing each ink stroke in the respective ink phrase data structure 332, the ink manager 310 also passes each ink stroke to the handwriting recognition manager 322 as indicated at block 412 (FIG. 4A). The handwriting recognition manager 322 in cooperation with the designated (or default) handwriting recognition engine 324, performs certain pre-recognition processing of the ink strokes, but does not yet perform recognition. For example, the handwriting recognition manager 322 and the designated engine 324 may compute running averages of stroke and gap sizes and run a primitive word segmentation model.

In addition, the ink phrase termination engine 312 of the ink manager 310 in conjunction with the pen driver 326 examines the new ink information retrieved from the tablet 118 and tablet specific driver 328 to determine or detect whether an ink phrase termination event has occurred as indicated by decision block 414. In the preferred embodiment, the ink phrase termination engine 312 applies three criteria or tests to the ink information in order to detect whether a phrase has terminated. First, the ink phrase termination engine 312 applies a "time-out" to the ink information. In particular, upon receipt of each ink data point at the pen driver 326, the ink phrase termination engine 312 commences/resets its timer 313, and if the timer 313 expires before the receipt of the next ink data point, the ink phrase termination engine 312 identifies an ink phrase termination event. The value of the time-out, which is on the order of a fraction of a second, is preferably user settable within a predefined range. More specifically, a user may display the configuration parameters for the ink manager 310 and, using a conventional slider, adjust the time-out. Alternatively, the time-out may be designated by the application 302a by a special ink manager API system call. Upon detecting such an ink phrase termination event, the pen driver 326 saves the event as a special buffer type and sends it to the ink manager 310. It should be understood that the termination engine 312 may be embodied largely within the pen driver 326.

The ink phrase termination engine 312 also applies an "out-of-proximity" test to the ink information gathered in pen driver 326. Specifically, tablet 118 and its associated tablet-specific driver 328 are preferably configured and arranged to determine not only when the pen 120 is in contact with the screen 202, but also when the pen is in-proximity to the screen 202. That is, tablet 118 senses when the pen 120 is near (e.g., ½ to ¾ of inch above), but not yet in contact with the screen 202. This proximity information, including the x-y coordinates of the pen, are provided by the tablet 118 (and its associated tablet-specific driver 328, if in use) to the pen driver 326. If the pen 120 is lifted beyond the sensing capabilities of the tablet 118 (i.e., the pen 120 is moved out-of-proximity), the ink phrase termination engine 312 detects such an occurrence and the pen driver 326 again saves the event as a special buffer type and sends it to the ink manager 310. That is, the pen driver 326 notices that it has stopped receiving ink data and/or in-proximity information from tablet 118 or tablet driver 328.

The ink phrase termination engine 312 may also apply an "out-of-area" test to the ink information, based on the bounding coordinates of one or more data entry fields or screen areas defined by the foreground application 302a. More specifically, the application 302a may define data entry fields 210a-c and supply the coordinates of these fields 210a-c to the ink manager 310. The ink phrase termination engine 312 compares the position information of the ink data points with the bounding coordinates provided by the application 302a. If it determines that the ink information being acquired by the pen driver 326, which initially fell within one of these data entry fields, e.g., box 210b (FIG. 2), has now moved outside of that field, it may have the pen driver 326 notify the ink manager 310.

In addition to the three ink phrase termination event tests that are applied by termination engine 312, the handwriting recognition manager 322 in cooperation with the handwriting recognition engine 324 applies a "recognition hard-break" test to the ink strokes being received from the ink manager 310. In particular, as part of its pre-processing of ink strokes received from the ink manager 310, the handwriting recognition manager 322 and designated engine 324 apply a primitive word segmentation model, such as a geometric probability model based on stroke- and word-gaps. If the word segmentation model concludes that a new ink stroke constitutes a new word, then the handwriting recognition manager 322 preferably notifies the ink manager 310, which treats the notification as an ink phrase termination event. For example, a new ink stroke that is located on a new line, e.g., line 204c, relative to the line on which the last ink stroke was located, e.g., line 204b, preferably causes the word segmentation model to issue an end of phrase event notification to the ink manager 310. An ink stroke whose x coordinate is substantially different from the x coordinate of the last ink stroke (e.g., the two ink strokes are multiple inches apart) would similarly cause the handwriting recognition manager to notify the ink manager 310. That is, the word segmentation model preferably applies some pre-defined, in-plane (i.e., within the plane of the screen 202) spatial constraints to the ink strokes. Those skilled in the art will understand that the word segmentation model may apply other constraints to detect the start of a new word.

All of the foregoing ink phrase termination tests are preferably applied substantially simultaneously to the ink information being received at the pen driver 326 and the ink manager 310, and an ink phrase is terminated upon the occurrence of any such event. That is, the pen driver 326 and/or ink manager 310 are continuously looking for the occurrence of any these ink phrase termination events. If none of the foregoing ink phrase termination events occurs, then the ink manager 310 returns to block 406 as indicated by NO arrow 416 from decision block 414, and continues to store the ink strokes from the pen driver 326 in the respective ink phrase data structure 332 and pass them to the handwriting recognition manager 322.

If the ink manager 310 obtains notification of an ink phrase termination event (either by the termination engine 312 via the pen driver 326 or the handwriting recognition manager 322), then it preferably responds as follows. First, it notifies the foreground application 302a of the occurrence of the ink phrase termination event as indicated by block 422 (FIG. 4B). For example, using the universal procedure pointer specified by the application 302a, the ink manager 310 may call the procedure in application 302a through an end-of-phrase callback with the so far un-labeled (i.e., un-recognized) ink phrase as an argument. The application 302a preferably responds to this callback in certain specified ways.

Upon receiving the ink phrase via the end-of-phrase callback, the application 302a may provide the ink manager 310 with an application-generated reference context (REF CON) for the ink phrase. The REF CON may simply be a tag generated by the application 302a for internally identifying or providing other information regarding the ink phrase. More typically, the REF CON may be a pointer to a data structure containing a variety of information of use to the application 302a. The REF CON is appended to the respective ink phrase data structure 332, e.g., by inserting it at field 508 (FIG. 5), as indicated at block 424. It should be understood that the ink manager 310 may associate the REF CON with the corresponding ink strokes passed to the application 302a without appending the REF CON to the ink phrase data structure 332. For example, the ink manager 310 may store the REF CON in some other data structure or memory which is accessible by it.

The application 302a may also identify a handwriting context to be used during recognition of the ink phrase. For example, suppose application 302a examines the ink phrase received from the ink manager 310 and, based on the location information of the respective strokes on the screen 202, determines that the strokes are generally located within data entry field 210a. Suppose also that data entry field 210a corresponds to "city", then the application 302a may direct the ink manager 310 to utilize a city vocabulary when performing recognition on this ink phrase. The recognition context may be loaded within field 510 (FIG. 5) of the ink phrase data structure. Alternatively, the application 302a may conclude that the ink strokes correspond to a screen location for receiving mathematical equations or musical compositions, and provide a corresponding recognition context. The application 302a may also confirm (or, by doing nothing, decline) certain context-dependent gestures.

Next, the application 302a declares to the ink manager 310 whether it wishes to "consume" the ink phrase as indicated at decision block 426. If so, the ink manager 310 causes the corresponding recognizer to discard the respective ink information as indicated at block 427 and then discards its own respective ink phrase data structure 332 as indicated at block 428. If the application 302a is not going to consume the ink phrase, then the ink manager 310 notifies the handwriting recognition manager 322 of the phrase termination event and instructs it to recognize the phrase as indicated at block 430. Since the handwriting recognition manager 322 received the ink strokes as they were retrieved by the ink manager 310 from the pen driver 326, the ink manager need not re-send the ink strokes to the handwriting recognition manager 322. Instead, the ink manager 310 simply tells the handwriting recognition manager 322 to recognize the ink strokes preceding the ink phrase termination event (which corresponds to the ink strokes in data field 506 (FIG. 5) of the data structure 332). The handwriting recognition manager 322 may contact the handwriting context manager 320 to identify an appropriate context, if any, for use in the recognition process.

Since the ink strokes being processed correspond to an ink phrase as defined by the respective ink phrase termination event, the strokes may correspond to multiple words. The invoked recognition engine 324 may thus generate several hypotheses each having different word breaks within the respective ink phrase. For example, the same ink, with an ambiguous initial letter and certain ambiguous character spacing could be recognized as either "boat ramp" or "to a tramp". It should be understood that the recognition results may instead consist of geometric shapes, alpha-numeric characters, musical notes, mathematical equations, or any other symbols known to the selected recognition engine.

Upon completing the recognition process, the handwriting recognition manager 322 sends the results to the ink manager 310. Specifically, the handwriting recognition manager 322 provides the ink manager 310 with the identifier (ID) of the invoked recognizer 324 (e.g., engine 1), and for each hypothesis, the manager 322 also supplies the recognition results, word counts for each phrasing hypothesis, alternate word lists for each word in each phrasing hypothesis, and possibly a description of the strokes used for each word. The ink manager 310 preferably appends the recognition results to the respective ink phrase data structure 332 as indicated at block 432. In particular, the ink manager 310 loads the recognition results into field 512 (FIG. 5). The ink manager 310 also forwards the recognition results and the previously generated REF CON, if any, to the application 302a as indicated at block 434. If a REF CON was originally provided by the application 302a, upon its return to the application 302a in block 434, the application may use that REF CON for any number of purposes, e.g., as a pointer to a data block that identifies the specific input field in which the ink was entered.

Those skilled in the art will understand that the application 302a may take any number of steps in response to receiving the recognition results. For example, the application 302a may display the recognition results to the user for confirmation or selection of the correct results if multiple hypotheses were returned by the recognition engine 324. The application 302a may also treat the recognition results as input and process those results in a conventional manner. In an appropriate system software environment, such as the Mac OS, the labeled ink phrase can be posted as an event to an application 302a, even if application 302a is not "ink aware" (has not called InkInit( ), and has no knowledge of the ink manager 310, pen driver 326, etc.). In this "compatibility" case, system default event handlers previously installed by and part of the ink manager 310 convert the recognized ink phrases into conventional non-ink events, such as keyDown events simulating the key presses on a conventional keyboard.

Once the active ink phrase has either been discarded or recognized and posted to the application 302a, the ink manager 310 and the pen driver 326 resume waiting for pen input from the user, as indicated by arrow 436 (FIG. 4B) that branches back to block 406 (FIG. 4A). If ink activity resumes (i.e., additional ink information is received at the pen driver 326), the pen driver 326 again begins accumulating data points into ink strokes (following the YES arrow out of block 406), then sends ink strokes on to the ink manager 310, which begins accumulating them into a new ink phrase (block 410), and the entire cycle begins again.

Those skilled in the art will understand that ink manager 310 and pen driver 326 may perform one or more "clean-up" functions (e.g., releasing memory, discarding data structures, and so on) if the user is inactive for some designated period of time. The ink manager 310 may also provide an InkDisposePhrase( ) system call to the application program 302a for use in de-allocating memory resources utilized during the pen activity.

The foregoing description has been directed to specific embodiments of this invention. It will be apparent, however, that other variations and modifications may be made to the described embodiments, with the attainment of some or all of their advantages. For example, it should be understood that the application program 302a may request receipt of raw ink information from the ink manager. Here, the ink manager 310 or the pen driver 326 directly provides the application program 302a with the ink data points received at the pen driver 326. Therefore, it is the object of the appended claims to cover all such variations and modifications as come within the true spirit and scope of the invention.

What is claimed is:

1. A system for managing ink information in a computer system having a pen-based input tablet, the system comprising:

a pen driver coupled to the pen-based input/display tablet and configured to collect and organize the ink information entered at the pen-based input tablet into ink strokes;

an ink memory area organized into one or more ink phrase data structures; and an ink manager coupled to the pen driver for receiving the ink strokes, the ink manager having an ink phrase termination engine configured to examine the ink information collected by the pen driver and, upon detecting the occurrence of an ink phrase termination event, to identify a respective end of an ink phrase to the ink manager;

whereby the ink information entered at the pen-based input tablet is associated with a client application; and the ink manager stores the ink strokes received prior to the ink phrase termination event in a selected ink phrase data structure and, in response to receiving from the client application a reference context affiliated with the un-recognized ink strokes of the ink phrase, associates the reference context with the ink strokes, wherein where the ink manager associates the reference context with the un-recognized ink strokes by appending the reference context to the selected ink phrase data structure.

2. A method for managing ink information in a computer system having a pen-based input tablet that may include an integrated display for generating ink information as a pen is moved across the tablet, the method comprising the steps of:

receiving the ink information generated by the input tablet;

organizing the ink information into corresponding ink strokes;

organizing the ink strokes into one or more ink phrases as defined by one or more ink phrase termination events including:

examining the ink information to determine whether an ink phrase termination event has occurred, and in response to the occurrence of an ink phrase termination event, segregating the ink strokes received prior to the termination event in a designated ink phrase data structure; and in response to receiving a reference context from a client application affiliated with the un-recognized ink strokes of the ink phrase, associating the reference context with the ink strokes, wherein the reference context is associated with the respective ink phrase by appending the reference context to the designated ink phrase data structure.

3. A computer readable medium containing executable program instructions for organizing ink information that is generated by a pen-based input tablet as a pen moves across the tablet and is associated with a client application the executable program instructions comprising program instructions for:

receiving the ink information generated by the input tablet;

organizing the ink information into corresponding ink strokes;

examining the ink information to determine whether an ink phrase termination event has occurred;

in response to the occurrence of an ink phrase termination event, segregating the ink strokes received prior to the termination event in a designated ink phrase data structure; and in response to receiving a reference context from the client application affiliated with the un-recognized ink strokes of the ink phrase associating the reference context with the ink strokes, wherein the reference context is associated with the ink strokes by appending the reference context to the designated ink phrase data structure.

* * * * *